(12) United States Patent
Hummel

(10) Patent No.: US 10,814,714 B2
(45) Date of Patent: Oct. 27, 2020

(54) HYBRID POWERTRAIN FOR A HYBRID-DRIVE MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 296 days.

(21) Appl. No.: 16/085,655

(22) PCT Filed: Mar. 17, 2017

(86) PCT No.: PCT/EP2017/056376
§ 371 (c)(1),
(2) Date: Sep. 17, 2018

(87) PCT Pub. No.: WO2017/158156
PCT Pub. Date: Sep. 21, 2017

(65) Prior Publication Data
US 2019/0118638 A1    Apr. 25, 2019

(30) Foreign Application Priority Data
Mar. 18, 2016    (DE) .......................... 10 2016 204 586

(51) Int. Cl.
*B60K 6/40*    (2007.10)
*B60K 6/383*    (2007.10)
(Continued)

(52) U.S. Cl.
CPC .............. *B60K 6/40* (2013.01); *B60K 6/383* (2013.01); *B60K 6/387* (2013.01); *B60K 6/48* (2013.01);
(Continued)

(58) Field of Classification Search
CPC .......... B60K 6/40; B60K 6/383; B60K 6/387; B60K 6/48; B60K 6/547;
(Continued)

(56) References Cited

U.S. PATENT DOCUMENTS 8,590,425 B2 * 11/2013 Pesola ................... H02K 7/006
                                                                74/665 D
9,242,546 B2 *  1/2016 Ruhle .................... B60K 6/442
(Continued)

FOREIGN PATENT DOCUMENTS

DE    10136725 A1    2/2002
DE    10329109 A1    1/2004
(Continued)

OTHER PUBLICATIONS

International Search Report with English translation and Written Opinion dated May 29, 2017 of corresponding International Application No. PCT/EP2017/056376; 17 pgs.
(Continued)

*Primary Examiner* — Bryan A Evans
(74) *Attorney, Agent, or Firm* — Maier & Maier, PLLC

(57) ABSTRACT

A hybrid powertrain for a hybrid-drive motor vehicle, with a transmission that can be shifted into different gear stages by shifting elements and can be in drive connection with an internal combustion engine via an internal combustion engine shaft, with an electric machine via an electric machine shaft, and with at least one vehicle axle via an output shaft. The internal combustion engine shaft and the electric machine shaft are arranged axially parallel to one another. The transmission is designed as a spur gear unit, in which the internal combustion engine shaft, the electric machine shaft, and the output shaft can be in drive connection with one another via spur gear sets that form gear planes and can be shifted by the shifting elements.

18 Claims, 9 Drawing Sheets

(51) Int. Cl.
*B60K 6/387* (2007.10)
*B60K 6/48* (2007.10)
*B60K 6/547* (2007.10)
*F16H 3/089* (2006.01)
*F16H 3/10* (2006.01)
*F16H 3/08* (2006.01)

(52) U.S. Cl.
CPC .............. *B60K 6/547* (2013.01); *F16H 3/089* (2013.01); *F16H 3/10* (2013.01); *B60K 2006/4816* (2013.01); *B60K 2006/4841* (2013.01); *F16H 2003/0822* (2013.01); *F16H 2200/0052* (2013.01); *Y02T 10/62* (2013.01)

(58) Field of Classification Search
CPC .... B60K 2006/4816; B60K 2006/4841; F16H 3/089; F16H 3/10; F16H 2003/0822; F16H 2200/0052
See application file for complete search history.

(56) References Cited

U.S. PATENT DOCUMENTS

| | | | | |
|---|---|---|---|---|
| 9,669,697 | B2* | 6/2017 | Mueller | B60K 6/48 |
| 2005/0139035 | A1* | 6/2005 | Lee | B60W 10/02 |
| | | | | 74/661 |
| 2019/0118638 | A1* | 4/2019 | Hummel | F16H 3/10 |
| 2019/0263247 | A1* | 8/2019 | Hummel | B60K 6/547 |
| 2019/0270374 | A1* | 9/2019 | Hummel | B60K 6/48 |
| 2019/0323579 | A1* | 10/2019 | Hummel | B60K 6/547 |

FOREIGN PATENT DOCUMENTS

| | | |
|---|---|---|
| DE | 102005040769 A1 | 3/2007 |
| DE | 102006027709 A1 | 12/2007 |
| DE | 102006054281 A1 | 6/2008 |
| DE | 102008047288 A1 | 4/2010 |
| DE | 102010023181 A1 | 1/2011 |
| DE | 102010030568 A1 | 12/2011 |
| DE | 112011101521 T5 | 6/2013 |
| DE | 112012003012 T5 | 5/2014 |
| DE | 102013211975 A1 | 8/2014 |
| DE | 102013204776 A1 | 9/2014 |
| DE | 102014210042 A1 | 12/2015 |
| EP | 1504946 A2 | 2/2005 |
| WO | 2008/138387 A1 | 11/2008 |
| WO | 2013/000830 A1 | 1/2013 |
| WO | 2014/122026 A1 | 8/2014 |

OTHER PUBLICATIONS

Examination Report dated Dec. 8, 2016 of corresponding German Application No. 102016204586.5; 7 pgs.
Notification of Transmittal of Translation of the International Preliminary Report on Patentability dated Sep. 20, 2018, in connection with corresponding international Application No. PCT/EP2017/056376 (7 pgs.).

* cited by examiner

Fig. 2a

| G1 | G2 | SE-A | SE-B | SE-C | SE-D | SE-E | SE-R | F | K |
|---|---|---|---|---|---|---|---|---|---|
| E1 | - |  |  |  | re |  |  | x |  |
| E2 | - | x |  |  |  |  |  |  | x |
| E3 | - |  |  | x |  |  |  |  | x |
| ER | - |  |  |  | re |  |  | x |  |
| VM1 | - |  | re |  | re |  |  | x | x |
| VM2 | - |  | ii |  | re |  |  | x | x |
| VM3 | - | x | re |  |  |  |  |  |  |
| VM4 | - |  |  |  |  | x |  |  |  |
| VM5 | - |  | re | x |  |  |  |  |  |
| VM6 | - |  | ii | x |  |  |  |  |  |
| VMR | - |  |  |  |  |  | re | x | x |
| E1 | VM1 |  | re |  | re |  |  | x | x |
| E1 | VM2 |  | ii |  | re |  |  | x | x |
| E1 | VM3 | x | re |  | re |  |  | x |  |
| E1 | VM4 |  |  |  | re | x |  | x |  |
| E1 | VM5 |  | re | x | re |  |  | x |  |
| E1 | VM6 |  | ii | x | re |  |  | x |  |
| E2 | VM3 | x | re |  |  |  |  |  | x |
| E2 | VM4 | x | re |  |  | x |  |  | x |
| E2 |  | x | ii |  |  | x |  |  | x |
| E3 | VM4 |  |  | x |  | x |  |  | x |
| E3 | VM5 |  | re | x |  |  |  |  | x |
| E3 | VM6 |  | ii | x |  |  |  |  | x |
| VM1 | E1 |  | re |  | re |  |  | x | x |
| VM2 | E1 |  | ii |  | re |  |  | x | x |
| VM3 | E1 |  | re |  | re |  |  | x |  |
| VM3 | E2 | x | re |  |  |  |  |  | x |
| VM4 | E1 |  |  |  | re | x |  | x |  |
| VM4 | E2 | x | re |  |  | x |  |  | x |
| VM4 | E2 | x | ii |  |  | x |  |  | x |
| VM4 | E3 |  |  | x |  | x |  |  | x |
| VM5 | E1 |  | re | x | re |  |  | x |  |
| VM5 | E3 |  | re | x |  |  |  |  | x |
| VM6 | E1 |  | ii | x | re |  |  | x |  |
| VM6 | E3 |  | ii | x |  |  |  |  | x |
| SL | - |  | re |  | ii |  |  |  | x |
| VM9 | - |  | ii |  | ii |  |  |  | x |

Fig. 2b

|    | VM |   |   |   |   |   |
|----|----|---|---|---|---|---|
| VM |    | 1 | 2 | 3 | 4 | 5 | 6 |
| 1  |    | 1 |   |   |   |   |
| 2  | 1  |   | 1 |   |   |   |
| 3  | 1  | 1 |   | 1/2 |   |   |
| 4  | 1  | 1 | 1 |   | 1/3 |   |
| 5  | 1  | 1 | 1 | 1/3 |   | 1/3 |
| 6  |    | 1 | 1 | 1/3 | 1/3 |   |

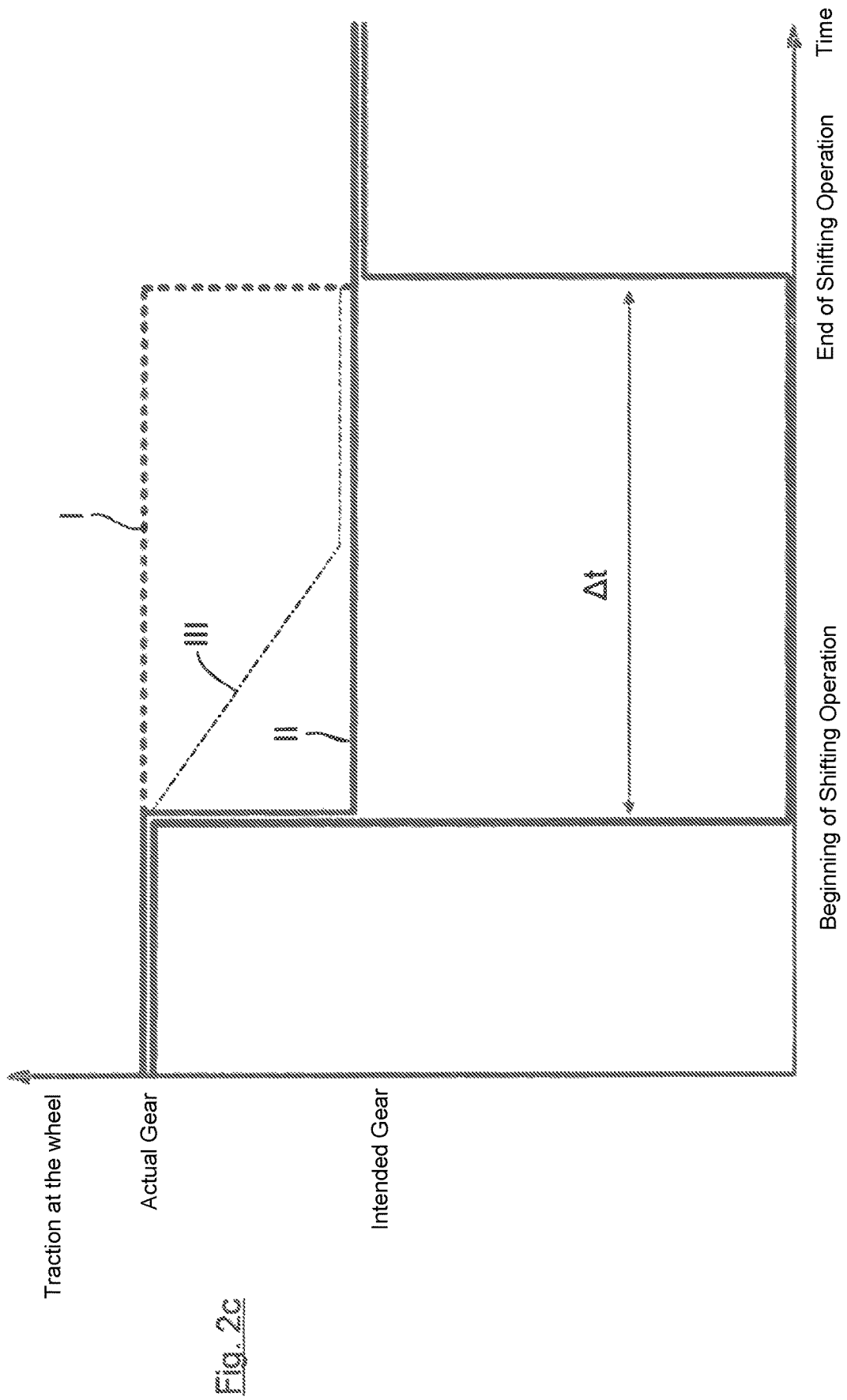

HYBRID POWERTRAIN FOR A HYBRID-DRIVE MOTOR VEHICLE

FIELD

The invention relates to a hybrid powertrain for a hybrid-drive motor vehicle.

BACKGROUND

Such a hybrid powertrain has, in addition to the internal combustion engine, an automatically shiftable transmission, which can be connected to an internal combustion engine via an internal combustion engine shaft and to an electric machine via an electric machine shaft. The automatic transmission can be designed in such a way that the electric machine can be operated as a starter/generator to engage a gear in the transmission, without interruption of the traction force, for a purely electric drive mode or for a hybrid drive mode. In addition, at the wish of a corresponding driver, it is possible for an acceleration to occur in boost mode (that is, when there is an increase in power demand during a passing maneuver, for example) with a torque additionally provided by the electric machine. In this case, the electric machine can be utilized as a sole drive source or as an auxiliary drive source or as a starter or generator for generating electric power and recuperation. A hybrid powertrain of this kind is known, by way of example, from DE 10 2005 040 769 A1, in which the transmission is built from two planetary gear sets, which can be shifted via a plurality of shifting elements, that is, clutches and brakes.

Known from DE 10 2008 047 288 A1 is a generic hybrid powertrain for a hybrid-driven vehicle, the transmission of which is designed as a dual clutch transmission. In said transmission, the internal combustion engine shaft leading to the internal combustion engine and the electric machine shaft leading to the electric machine are arranged axially parallel to each other. The transmission can be in drive connection at the output end with at least one vehicle axle by way of an output shaft.

SUMMARY

The object of the invention consists in making available a hybrid powertrain that, in a design that is simple in terms of construction and is more favorable in terms of packing space in comparison with the prior art, has a greater degree of freedom in terms of functionality.

In accordance with the present invention, the transmission is no longer constructed as a dual clutch transmission or with planetary gear sets, but rather as a pure spur gear transmission, in which the internal combustion engine shaft, the electric machine shaft, and the output shaft can be in drive connection with one another via spur gear sets, and, in fact, with the complete elimination of planetary gear sets. The spur gear sets form gear planes, which can be shifted via the shifting elements. In this way, a simply constructed transmission structure is achieved, which, in comparison to a planetary gear unit, can be operated substantially more efficiently.

In a variant of embodiment that will be described later in detail, the transmission has a total of six synchronization units for the shifting of six forward gears of the internal combustion engine and of three forward gears of the electric motor, namely, exactly four gear selectors, an overrunning clutch, and a multi-plate clutch.

In an embodiment variant, the transmission can have an intermediate shaft that is axially parallel to the internal combustion engine shaft and to the electric machine shaft. The intermediate shaft can be connected to the output shaft via a spur gear set that forms a first gear plane RE-V4. Alternatively and/or additionally, the intermediate shaft can be connected to the electric machine shaft via a spur gear set that forms a second gear plane RE-E1 and/or to the electric machine shaft via a spur gear set that forms a third gear plane. In addition, the intermediate shaft can be connected to the internal combustion engine shaft via a spur gear set that forms a fourth gear plane.

In a technical embodiment, the first gear plane RE-V4 can have a gearwheel that is mounted on the output shaft in a rotationally resistant manner and a gearwheel that meshes with it and is mounted on the intermediate shaft in a rotationally resistant manner. The first gear plane RE-V4 can have, in addition, a loose gearwheel mounted on the internal combustion engine shaft in a rotatable manner, which meshes with the intermediate shaft gearwheel and can be coupled to the internal combustion engine shaft via a shifting element SE-E.

The second gear plane RE-E1 can have a gearwheel that is mounted on the electric machine shaft in a rotationally resistant manner and an intermediate shaft gearwheel meshing with it, which can be coupled to the intermediate shaft via a freewheel or overrunning clutch. In a technical embodiment, the overrunning clutch can be assigned a shifting element SE-D, which, in a traction mode position, permits a transmission of torque from the electric machine in the direction of the intermediate shaft and, in the opposite direction, has an overrun function, that is, it prevents the transmission of torque. In a traction/coasting mode position, the shifting element can permit the transmission of torque in both directions. In another overrun position, in contrast, the shifting element can prevent the transmission of torque in both directions.

Alternatively and/or additionally, the third gear plane RE-E3 can have a loose gearwheel mounted on the intermediate shaft in a rotatable manner, which can be coupled to the intermediate shaft via a shifting element SE-C. The loose gearwheel of the third gear plane can mesh with a loose gearwheel, which is mounted on the electric machine shaft in a rotatable manner and can be coupled to the electric machine shaft via a shifting element, in particular via a multi-plate clutch.

The third gear plane RE-E3 can have, in addition, a loose gearwheel that is mounted on the internal combustion engine shaft in a rotatable manner. Said loose gearwheel can be coupled via a shifting element SE-A to the loose gearwheel mounted on the internal combustion engine shaft of the first gear plane RE-V4 or via a shifting element SE-B to the internal combustion engine shaft.

In an embodiment variant, the fourth gear plane RE-V5 can have a loose gearwheel that is mounted on the intermediate shaft in a rotatable manner and can be coupled to the intermediate shaft via a shifting element SE-C. This loose gearwheel can mesh with a loose gearwheel that is mounted on the internal combustion engine shaft in a rotatable manner and can be coupled to the internal combustion engine via a shifting element SE-B.

It is preferred when the loose gearwheel of the fourth gear plane RE-V5 that is mounted on the intermediate shaft in a rotatable manner and the loose gearwheel of the third gear plane RE-E3 that is mounted on the intermediate shaft in a rotatable manner are arranged in a rotationally resistant manner on a hollow shaft that is mounted coaxially on the intermediate shaft in a rotatable manner. The hollow shaft can be coupled to the intermediate shaft by way of exactly one shifting element SE-C.

The number of shifting elements installed in the transmission can be reduced in the following embodiment variant: Thus, the above-mentioned shifting element SE-A and the likewise already mentioned shifting element SE-E can be combined to form a common shifting element SE-A. Said common shifting element can, in a first shift position, couple the loose gearwheel of the first gear plane RE-V4, which is mounted on the internal combustion engine shaft in a rotatable manner, to the internal combustion engine shaft, and, in a second shift position, to the loose gear wheel of the third gear plane RE-E3, which is mounted on the internal combustion engine shaft in a rotatable manner.

In an installed variant with a reduced number of components, the output shaft can be designed as a pinion shaft of an axle differential of the vehicle axle. In an all-wheel drive, the gearwheel arranged on the intermediate shaft in a rotationally resistant manner can mesh not only with the gearwheel arranged on the output shaft in a rotationally resistant manner, but additionally also with a fixed gearwheel of a cardan shaft leading to the second vehicle axle. For a reduction in packing space, it is preferable when the electric machine shaft is designed as a hollow shaft that is mounted coaxially on the cardan shaft in a rotatable manner.

In regard to a simple embodiment of a reverse gear, the electric machine can be operated in the reverse direction of rotation (that is, an electric motor reverse gear). Alternatively to this, the transmission can have a spur gear set that forms a gear plane RE-VR of a reverse gear. In a first embodiment, the gear plane RE-VR of the reverse gear has a loose gearwheel mounted on the internal combustion engine shaft in a rotatable manner, which can be coupled to the internal combustion engine shaft via a shifting element SE-ft and a loose gearwheel mounted on the electric machine shaft in a rotatable manner and meshing with it, which, together with the loose gearwheel that is mounted on the electric machine in a rotatable manner, is arranged in a rotationally resistant manner on a hollow shaft, which is mounted on the electric machine shaft coaxially in a rotatable manner and can be coupled to the electric machine shaft by use of the shifting element K.

Alternatively to this, the gear plane RE-VR of the reverse gear can have a gearwheel arranged on the internal combustion engine shaft in a rotationally resistant manner, which, by way of intervening engagement with an intermediate gearwheel, meshes with a loose gearwheel that is mounted on the intermediate shaft in a rotatable manner. Said loose gearwheel can be coupled via a shifting element SE-C to the hollow shaft that is mounted on the intermediate shaft in a rotatable manner.

Alternatively to this, it is possible to dispense with the provision of an additional gear plane of the reverse gear and, instead of this, to provide a reverse gear shaft that is axially parallel to the internal combustion engine shaft. It is possible to mount on the reverse gear shaft in a rotatable manner a loose gearwheel that meshes with the loose gearwheel of the second gear plane RE-E1, which is mounted on the intermediate shaft, and can be coupled to the reverse gear shaft via a shifting element SE-R. It is also possible to arrange on the reverse gear shaft, in addition, a fixed gearwheel that meshes with the fixed gearwheel of the output shaft.

In regard to a design that is favorable in terms of packing space, all of the gear planes can be arranged between the internal combustion engine and the electric machine in the axial direction. In particular, the first gear plane RE-V4 or alternatively, the second gear plane RE-E1 can be positioned on the transmission side that faces the internal combustion engine.

The transmission according to the invention can be utilized both for longitudinally installed powertrains and for transversely installed powertrains. In the case of a transverse installation, the electric machine is situated parallel to the gear set. In the case of a longitudinal installation, the electric machine is situated behind the transmission in a tunnel in the longitudinal direction of the vehicle. In addition, the following types of shifting can be carried out with the transmission: namely, (simple or multiple) upshifting or downshifting, gear engagement, gear disengagement, or a change in gear. In this case, it is possible to shift, at any time and as desired, between a purely electric operation or a purely internal combustion engine operation as well as a hybrid drive mode. In this way, during acceleration of the vehicle (for example, from 0 to 100 km/h or from 80 to 120 km/h), a plurality of shifting possibilities are available. In addition, the transmission makes possible a charging at standstill, a charging during creeping, that is, in a driving status during startup, in which the multi-plate clutch is still being operated with slippage), and a charging during driving (as a raising of the load point) or recuperation.

With the above transmission structure, the forward gears of the electric motor and of the internal combustion engine can result in two or four gear engagements. The reverse gears of the internal combustion engine have—depending on the design thereof—three or five gear engagements.

The embodiments and enhancements of the invention can—except in cases of clear dependencies or incompatible alternatives, for example—be employed with one another individually or else in any desired combination.

BRIEF DESCRIPTION OF THE DRAWINGS

The invention and its advantageous embodiments and enhancements thereof as well as the advantages thereof will be explained in detail below on the basis of drawings.

Shown herein are:

FIG. 2a a shifting matrix of the transmission shown in FIG. 1;

FIG. 2b a shifting matrix, from which the electric motor supporting gears for shifting between the internal combustion engine gears, without interruption of the traction force, can be seen;

FIG. 2c a diagram in which a shifting operation between internal combustion engine gears. without interruption of the traction force, is illustrated;

DETAILED DESCRIPTION

Figure 1:
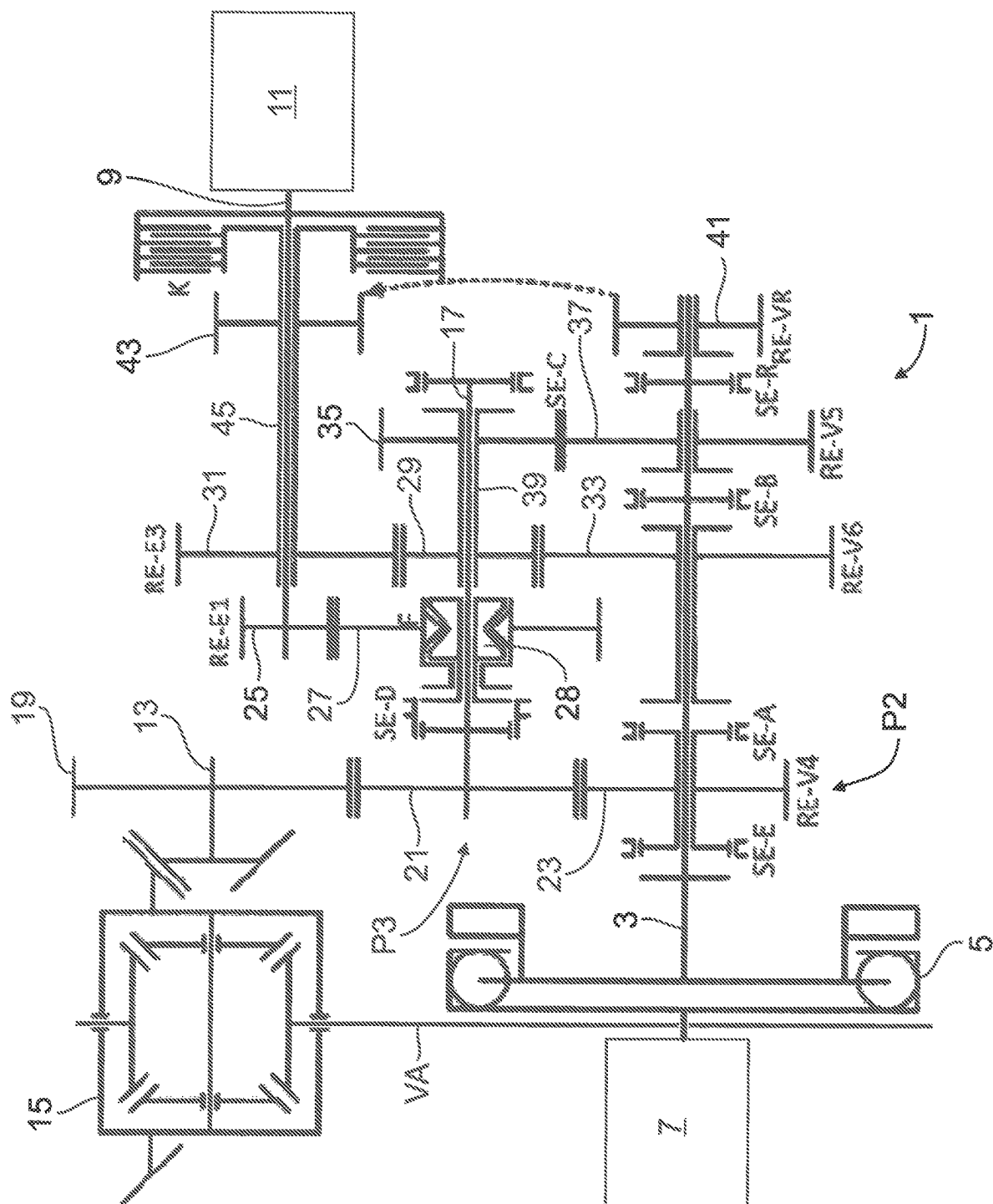
FIG. 1 as a block circuit diagram, a hybrid transmission designed as a spur gear unit.

The automatically shiftable vehicle transmission 1 shown in FIG. 1 is a part of a hybrid powertrain of a hybrid-drive motor vehicle, which is not illustrated. The transmission 1, which can be engaged in different gear stages by means of shifting elements, is connected to an internal combustion engine 7 via an internal combustion engine shaft 3, which has interposed torsion dampers 5, as well as to an electric machine 11 via an electric machine shaft 9. The electric machine 11 can have an intermediate gear, which is not illustrated, for torque conversion. In addition, the transmission 1 is in drive connection at the output end with a front axle VA of the vehicle via an output shaft 13. The output shaft 13 is in operative connection, as a pinion shaft, with the bevel gear drive of a front-axle differential 15.

As ensues from FIG. 1, the internal combustion engine shaft 3, the electric machine shaft 9, and an interposed intermediate shaft 17 are arranged axially parallel to one another. The intermediate shaft 17, the electric machine shaft 9, and the output shaft 13 can be in drive connection with one another via spur gear sets, which can be shifted via the shifting elements. The spur gear sets form gear planes that are arranged parallel to one another and, in accordance with FIG. 1, are all situated in the axial direction between the internal combustion engine 7 and the electric machine 11.

The transmission structure shown in FIG. 1 is described in the following: Thus, the intermediate shaft 17 can be connected to the output shaft 13 via a first gear plane RE-V4 and to the electric machine shaft 9 via a second gear plane RE-E1. In addition, the intermediate shaft 17 can be connected to the electric machine shaft 9 and to the internal combustion engine shaft 3 via a third gear plane RE-E3 and to the internal combustion engine shaft 3 via a fourth gear plane RE-V5.

The first gear plane RE-V4 has a gearwheel 19, which is mounted on the output shaft 13 in a rotationally resistant manner, and a gearwheel 17, which meshes with it and is mounted on the intermediate shaft 17 in a rotationally resistant manner. In addition, the first gear plane RE-V4 has a loose gearwheel 23 that is mounted on the internal combustion engine in a rotatable manner, which meshes with the intermediate shaft gearwheel 21 and can be coupled to the internal combustion engine shaft 3 via a shifting element SE-E.

The second gear plane RE-E1 has a gearwheel 25, which is mounted on the electric machine shaft 9 in a rotationally resistant manner, and an intermediate shaft gearwheel 27 that meshes with it and can be connected to the intermediate shaft 17 via an overrunning clutch F. The overrunning clutch F is assigned a shifting element SE-D, which can be shifted into three operating positions: In a first traction mode position (that is, in the center position of SE-D in the shifting matrix of FIG. 2a), a transmission of torque from the electric machine 11 in the direction of the intermediate shaft 17 is made possible and, in the opposite direction, the overrunning function is activated, that is, a transmission of torque is prevented. Therefore, provided that the intermediate shaft gearwheel 27 rotates faster than the freewheel inner side 28 coupled to the intermediate shaft 17, the intermediate shaft gearwheel 27 drives the freewheel inner side 28 coupled to the intermediate shaft 17. In a second traction/coasting position (that is, the right position of SE-D in the shifting matrix of FIG. 2a), the transmission of torque is made possible in both directions. In a third overrun position (that is, in the left position of SE-D in the shifting matrix of FIG. 2a), in contrast, the transmission of torque is prevented in both directions, as is required in a later described charging operation at standstill and during startup of the internal combustion engine.

The third gear plane RE-E3 is formed from a loose gearwheel 29 that is mounted on the intermediate shaft 17 in a rotatable manner, which can be coupled to the intermediate shaft 17 via a shifting element SE-C and is formed from a loose gearwheel 31, which meshes with it and is mounted on the electric machine shaft 9 in a rotatable manner and which can be coupled to the electric machine shaft 9 via a multi-plate clutch K. The third gear plane RE-E3 has, in addition, a loose gearwheel 33 that is mounted on the internal combustion engine shaft 3 in a rotatable manner and can be coupled to the loose gearwheel 23 of the first gear plane RE-V4, which is mounted on the internal combustion engine shaft 3 in a rotatable manner, via a shifting element SE-A or can be coupled to the internal combustion engine 3 via a shifting element SE-B.

The fourth gear plane RE-V5 has a loose gearwheel 35, which is mounted on the intermediate shaft 17 and can be coupled to the intermediate shaft 17 via a shifting element SE-C, and meshes with a loose gearwheel 37 that is mounted on the internal combustion engine shaft 3 in a rotatable manner. The loose gearwheel 37 can be coupled to the internal combustion engine 3 via the already mentioned shifting element SE-B.

In addition, the loose gearwheel 35 of the fourth gear plane RE-V5, which is mounted on the intermediate shaft 17, and the loose gearwheel 29 of the third gear plane RE-E3, which is likewise mounted on the intermediate shaft 17, are arranged in a rotationally resistant manner on a hollow shaft 39 that is coaxially mounted on the intermediate shaft 17 in a rotatable manner. The hollow shaft 39 can be coupled to the intermediate shaft 17 via exactly one shifting element SE-C.

As ensues from FIG. 1, the transmission 1 has an additional gear plane RE-VR of the reverse gear, which is formed from a loose gearwheel 41, which is mounted on the internal combustion engine shaft 3 in a rotatable manner, and a loose gearwheel 43, which meshes with it and is mounted on the electric machine shaft 9 in a rotatable manner. The loose gearwheel 41 can be coupled to the internal combustion engine 3 via a shifting element SE-ft whereas the gearwheel 43, together with the loose gearwheel 31 of the third gear plane RE-E3 that is mounted on the electric machine shaft 9, is arranged in a rotationally resistant manner on a hollow shaft 45, which is mounted coaxially on the electric machine shaft 9 in a rotatable manner and can be coupled to the electric machine 9 via the multi-plate clutch K. When the reverse gear is engaged, there results a load path from the internal combustion engine 7, via the internal combustion engine shaft 3, via the reverse gear plane RE-VR, and via the closed multi-plate clutch K, to the fixed gearwheel 25 of the second level RE-E1 mounted on the electric machine shaft 9 and, further, via the overrunning clutch F and the shifting element SE-D, to the gear plane RE-V4. Therefore, the reverse gear is realized as a torsion gear, which utilizes, besides the gear plane RE-VR of the reverse gear, the second gear plane RE-E1 and the first gear plane RE-V4.

In FIG. 1 the internal combustion engine shaft 3 is free of gearwheels; that is, the internal combustion engine shaft 3 has no gearwheel that is arranged on it in a rotationally resistant manner, but rather only two synchronizations (at SE-B and at SE-R) as well as a clutch toothing (at SE-E). In addition, in FIG. 1, the shifting element SE-E and the shifting element SE-A are respectively arranged on the two sides of the loose gearwheel 23, which is mounted on the internal combustion engine shaft 3 in a rotatable manner. By way of the two shifting elements SE-E and SE-A, both the electric machine 11 and the internal combustion engine 7 can be linked at the same time to the loose gearwheel 23 of the first gear plane RE-V4.

In the above transmission structure, the electric machine 11 can be linked in different positions (that is, P2 position, P3 position) to the powertrain: Thus, the electric machine 11 can be linked via a P2 load path at a P2 position (that is, near to the drive end and in the transmission 1) to the first gear plane RE-V4. The P2 load path extends from the electric machine 11 via the electric machine shaft 9, the closed multi-plate clutch K, the hollow shaft 45, the third gear plane RE-E3, and the closed shifting element SE-A, to the loose gearwheel 23 of the first gear plane RE-V4, which is mounted on the internal combustion engine shaft 3 in a rotatable manner. The P2 position corresponds to an electric machine position in which the electric machine 11 is engaged in drive connection between the internal combustion engine 7 and the transmission 1.

Alternatively to this, the electric machine 11 can be linked via a P3 load path at a P3 position (that is, near to the driven end and in the transmission 1) to the first gear plane RE-V4. The P3 load path extends from the electric machine 11 via the electric machine shaft 9, the second gear plane RE-E1 with the overrunning clutch F thereof, and the intermediate shaft 17, to the intermediate shaft gearwheel 21 of the first gear plane RE-V4.

The shifting elements SE-A, SE-B, SE-C, SE-D, SE-ft SE-E shown in FIG. 1 can designed as known single or dual synchronous clutches, which are common in manual transmissions, each of which are shifted from a neutral position under electronic control via corresponding electrically/hydraulically operated actuators. The clutch K can be a hydraulically load-shiftable multi-plate clutch.

With the transmission arrangement shown in FIG. 1, it is possible to carry out a plurality of forward gear shifts involving only four spur gear sets. By way of example, in the shifting matrix of FIG. 2a, six internal combustion engine gears VM1 to VM6 and three electric motor gear stages EM1 to EM3 are realized, by use of which the hybrid powertrain can be driven solely by an electric motor or solely by an internal combustion engine as well as in a hybrid drive mode (that is, for example, VM/EM boosts, EM recuperation). In addition, the transmission 1 is designed in such a way that each intended gear can be reached from any desired current gear by way of at most two shifts without interruption of the traction force and that the possibility of repeated downshifts exists (for example, from VM5 to VM3 or from VM5 to VM2).

The shifting elements SE-A to SE-R as well as the multi-plate clutch K are designed in such a way that they can carry out a synchronization during gear set shifts.

As ensues from the shifting matrix (FIG. 2a), the internal combustion engine gears VM1 to VM3 are designed as torsion gears that utilize all four gear planes. The gears VM4 to VM6 are designed as simple gears, all of which utilize the gear plane RE-V4 (VM4) or the gear plane RE-V4 in combination either with the gear plane RE-V5 (VM5) or with the third gear plane RE-V6 (VM6).

In the electric motor first gear EM1, the shifting element SE-D is moved to the right. This results in a load path in which the electric machine shaft 9, the second gear plane RE-E1, including the overrunning clutch F, the intermediate shaft 17, and the first gear plane RE-V4 are incorporated. In the electric motor first gear EM1, the multi-plate clutch K is opened or disengaged. In contrast to this, in the electric motor second gear EM2, the multi-plate clutch K is closed or engaged and the shifting element SE-A is operated. In the resulting load path (for EM2), the electric machine shaft 9, the multi-plate clutch K, the hollow shaft 45, the third gear plane RE-E3, the shifting element SE-A, and the first gear plane RE-V4 are incorporated. Therefore, the electric motor second gear EM2 is a torsion gear, which utilizes the third gear plane RE-E3 as well as the first gear plane RE-V4. The same also holds true for the third electric motor gear EM3, the load path of which, however, extends not via the shifting element SE-A, but rather via the engaged shifting element SE-C and the intermediate shaft 17 to the first gear plane RE-V4. In this way, by means of the overrunning clutch F and the multi-plate clutch K, a load shift occurs between the gears EM1 and EM2 and between the gears EM1 and EM3 without interruption of the traction force. A shift between EM2 and EM3 without interruption of the traction force is realized in contrast, via the electric motor first gear EM1, which, in this case, acts as a supporting gear (that is, the shift sequence EM2-EM1-EM3 or EM3-EM1-EM2).

As illustrated in the shifting matrix (FIG. 2a), moreover, it is possible to link different internal combustion engine gears to each of the electric motor gears EM1 to EM3 (for example, EM1+VM1 or EM1+VM3). The same also applies to the internal combustion engine gears VM1 to VM6 (for example, VM4+EM1 or VM4+EM3). Consequently, the transmission 1 can be operated with different internal combustion engine and electric motor gears at the same time.

As further ensues from the shifting matrix (FIG. 2a), it is possible to shift from all internal combustion engine gears VM1 to VM6 to the first electric motor gear EM1 or, in the hybrid drive mode, to combine all internal combustion engine gears VM1 to VM6 with the first electric motor gear EM1. From the internal combustion engine gears VM3 and VM4, it is additionally possible to shift to the second electric motor gear EM2 or, in the hybrid drive mode, to combine the internal combustion engine gears V3 and V4 with the second electric motor gear EM2. From the internal combustion engine gears VM4, VM5, and VM6, it is additionally possibly to shift to the third electric motor gear EM3 or, in the hybrid drive mode, to combine the internal combustion engine gears VM4, VM5, and VM6 with the third electric motor gear EM3. The same also applies in the reverse direction of shift, that is, for shifting from one of the electric motor gears to the internal combustion engine gears.

As further ensues from the shifting matrix (FIG. 2a), the internal combustion engine gears VM1 and VM2 each make available a load path in which the electric machine shaft 9 is integrated; that is, the electric machine shaft 9 co-rotates in the gears VM1 and VM2. In contrast to this, the internal combustion engine gears VM3 to VM6 each make available a load path in which the electric machine shaft 9 is not integrated; that is, the electric machine shaft 9 does not co-rotate in the gears VM3 to VM6, but rather is at a standstill. The electric machine 11 is therefore decoupled from the powertrain in the gears VM3 to VM6

In addition, it is to be noted that the electric motor gears EM1 to EM3 each make available a load path in which the internal combustion engine shaft 3 is not integrated; that is, the internal combustion engine shaft 3 does not co-rotate when the gears EM1 to EM3 are engaged, but rather is at a standstill. The internal combustion engine 7 is therefore decoupled from the powertrain when the gears EM1 to EM3 are engaged.

In the following, special types of driving modes that can be realized by means of the transmission 1 are emphasized:

Thus, the transmission structure shown in FIG. 1 makes it possible to start up an internal combustion engine from standstill of the vehicle as follows: When the vehicle is at a standstill, the internal combustion engine 7 runs at an idling speed. The shifting elements SE-E and SE-C are in their neutral position, that is, they are disengaged. The shifting element SE-A is engaged and the shifting element SE-B is moved to the right and the multi-plate clutch K is still disengaged. In this state, the internal combustion engine shaft 3 drives the fourth gear plane RE-V5 as well as, via the hollow shaft 39, the third gear plane RE-E3 as well as the hollow shaft 45, which is mounted on the electric machine shaft 9 in a rotatable manner, at a rotational speed that correlates with the idling speed of the internal combustion engine 7. For startup, the multi-plate clutch K is engaged, as a result of which a transmission of torque from the hollow shaft 45 and the electric machine shaft 9 takes place by way of the overrunning clutch F to the driven end (that is, to the gear plane RE-V4). Therefore, the transmission structure makes possible a startup by the electric motor, even though no startup element is present between the internal combustion engine 7 and the transmission 1.

In addition, the transmission 1 makes possible a boost mode, in which, for individual internal combustion engine gears VM1 to VM6, a plurality of electric motor gears are available for boosting. Conversely, individual electric motor gears EM1 to EM3 make available a plurality of internal combustion engine gears for boosting.

The transmission structure shown in FIG. 1 makes it possible, in the electric motor mode, to shift from EM1 to EM2, without interruption of the traction force, as follows: Thus, in the first electric motor gear EM1, the force flows from the electric machine 11, the electric machine shaft 9, the overrunning clutch F, and the shifting element SE-D of the second gear plane RE-E1 as well as from the intermediate shaft 17 to the first gear plane RE-V4. For a shift into the second electric motor gear EM2 without interruption of the traction force, first of all, the shifting element SE-A is engaged and, subsequently, the multi-plate clutch K is engaged. This creates a flow of force, namely, a flow of force from the hollow shaft 45 mounted on the electric machine shaft 9, the third gear plane RE-E3, the operated shifting element SE-A, and the shifted loose gearwheel 23 to the first gear plane RE-V4. Based on the gear stages, the freewheel inner side of the overrunning clutch F is raised from the freewheel outer side connected to the gearwheel 27, so that no transmission of torque occurs any longer from the electric machine 11 via the overrunning clutch F and the gear EM2 is engaged. When there is a downshift into the first gear EM1, the multi-plate clutch K would initially be disengaged and, as a result, the inner plate supports thereof would slip through, so that the rotational speed at the electric machine shaft 9 would increase until the overrunning clutch F is again engaged. The same shift without interruption of the traction force can also be carried out between the gear EM1 and the gear EM3.

In addition, the transmission structure shown in FIG. 1 makes possible a charging of the electric machine 1 (identified as SL in the shifting matrix of FIG. 2*a*) at a standstill, provided that, for example, the vehicle is at a standstill at a traffic light or is in a traffic jam: In this case, the shifting element SE-B is moved to the right in order to connect the internal combustion engine shaft 3 to the fourth gear plane RE-V5 and to the hollow shaft 45, which is mounted on the electric machine shaft 9 in a rotatable manner. The overrunning clutch F is engaged in its overrun position, in which it is activated in both directions of overrun; that is, in both directions, no transmission of torque is possible (that is, SE-D li in the shifting matrix of FIG. 2*a*). In this case, force flows from the internal combustion engine 7, via the internal combustion engine shaft 3, the shifting element SE-B, the fourth gear plane RE-V5, the hollow shaft 39, the third gear plane RE-E3, the hollow shaft 45, and the engaged clutch K, to the electric machine 11. It is to be noted, in addition, that the standstill charging mode can be carried out without engagement of the parking lock.

As discussed above, when the vehicle is at a standstill, it is possible, by engaging the multi-plate clutch K, to connect the running internal combustion engine 7 to the electric machine 11 and, accordingly, to charge the traction battery for electric driving or reversing. In this case, the shifting element SE-D is in its third overrun position (that is, left position of SE-D in the shifting matrix of FIG. 2*a*), as a result of which the transmission of torque in both directions is prevented.

A startup of the internal combustion engine (identified as VM-S in the shifting matrix of FIG. 2*a*) can be carried out by use of the electric machine 11. The electric machine 11 can start the internal combustion engine 7 via a load path in which the shifting element SE-B is moved to the right or left and in which the overrunning clutch F is engaged in its overrun position (that is, SE-D li in the shifting matrix of FIG. 2*a*). By engaging the multi-plate clutch K, the electric machine 11 can start up the internal combustion engine 7. The electric machine 11 can be at standstill when the multi-plate clutch K is engaged and start when the internal combustion engine 7 starts up. Alternatively to this, the electric machine 11 can adjust a defined rotational speed when the multi-plate clutch K is disengaged and then start up the internal combustion engine 7 by engaging the multi-plate clutch K.

It is possible, in addition, without interruption of the traction force, to shift between the internal combustion engine gears VM1 to VM6 by use of the electric machine 11, as is indicated in the shifting matrix of FIG. 2*b*. In the shifting matrix, in a top horizontal row and in a lateral vertical row, the six internal combustion engine gears VM1 to VM6 are each listed. They converge in horizontal and vertical extension in boxes, in which the numbers 1, 2, and/or 3 are entered. The numbers 1, 2, or 3 given in the boxes symbolize the electric motor gears EM1, EM2, EM3, which can act as supporting gear(s) in the internal combustion engine shifting. The engaged electric motor supporting gear makes available a supporting load path between the electric machine 11 and the transmission output during the shifting operation. Accordingly, during the shifting operation (that is, the internal combustion engine 7 is decoupled from the powertrain), the electric machine 11 can produce a drive torque, which is transmitted to the driven end via the supporting load path.

Described in the following, by way of example, is a shifting operation from the internal combustion engine gear VM5 to the internal combustion engine gear VM3, occurring in the drive mode without interruption of the traction force. In this shifting operation, in accordance with the shifting matrix of FIG. 2*b*, the electric motor gear EM1 serves as a supporting gear: In the gear VM5, the shifting element SE-B is shifted to the right and the shifting element SE-C is actuated (compare shifting diagram of FIG. 2*a*). A load path thereby extends from the internal combustion engine 7, the fourth gear plane RE-V5, and the intermediate shaft 17 to the first gear plane RE-V4. At the beginning of the shifting operation, the internal combustion engine 7 is switched off and, to the same extent, the electric machine 11 is powered up. As soon as the gearwheel 27 of the second gear plane RE-E1, which is mounted on the overrunning clutch F, rotates faster than the intermediate shaft 17, there occurs a load transfer from the internal combustion engine 7 to the electric machine 11. After the load transfer to the electric machine 11 has occurred, the shifting operation from the current gear VM5 to the intended gear VM3 is carried out; that is, the shifting element SE-C is shifted into the neutral position, the shifting element A is actuated, and the shifting element SE-B remains shifted to the right. This results in a load path from the internal combustion engine 7, via the shifting element SE-B, the fourth gear plane RE-V5, the hollow shaft 39, which is mounted on the intermediate shaft 17 in a rotatable manner, the third gear plane RE-E3, and the shifting element A, to the first gear plane RE-V4. At the end of the shifting operation, the internal combustion engine 7 is again switched on and, to the same extent, the electric machine 11 is powered down. As soon as the intermediate shaft 17 rotates faster than the gearwheel 27 of the second gear plane RE-E1, which is mounted on the overrunning clutch F, the freewheel inner side 28 is raised from the gearwheel 27; that is, there occurs a load transfer from the electric machine 11 to the internal combustion engine 7 and the intended gear VM3 is engaged.

The above shifting operation is roughly illustrated schematically in FIG. 2c in a time interval Δt. In accordance therewith, during the shifting operation Δt, any desired adjustable torque curve I, II or III is created by the electric machine 11, as shown, by way of example, in FIG. 2c. The torque curve I generated by the electric machine 11 during the shifting operation Δt is shown with a dashed line, according to which the torque produced by the electric machine 11 is of such a magnitude that the traction force at the wheel during the shifting operation Δt stays constant and is reduced in steps only at the end of the shifting operation Δt, namely, to a value that correlates with the traction force at the wheel when the intended gear of the internal combustion engine is engaged. Alternatively to this, a torque curve II, generated by the electric machine 11, is shown with a solid line. In accordance therewith, the torque produced by the electric machine 11 is of such a magnitude that the traction force at the wheel is reduced in steps immediately at the beginning of the shifting operation Δt to a value that correlates with the traction force at the wheel when the intended gear of the internal combustion engine is engaged. Alternatively to this, the electric machine 11 can create a torque curve III, which is indicated by a dot-dash line and in which the torque produced by the electric machine 11 stays constant and is then reduced in accordance with a ramp function to a value that correlates with the traction force at the wheel when the intended gear of the internal combustion engine is engaged.

As further ensues from the shifting matrix of FIG. 2b, at least one electric motor gear is available when there is a shifting operation between internal combustion gears without interruption of the traction force. For certain shifting operations (for example, VM5→VM6), two electric motor gears, EM1 or EM3, are available.

In addition, the transmission structure shown FIG. 1 makes it possible to realize a drag start of the internal combustion engine 7 without an additional starting motor/starter: For such a drag start, for example, the gear EM1 is engaged and the electric machine 11 is powered up until the rotational speed limit is reached. In this driving mode, the third gear plane RE-E3, the fourth gear plane RE-V5, and the internal combustion engine shaft 3 are idled, so that the shifting element SE-B can be engaged. Subsequently, the multi-plate clutch K is engaged and, in this way, the internal combustion engine 7 is dragged along.

Figure 3:
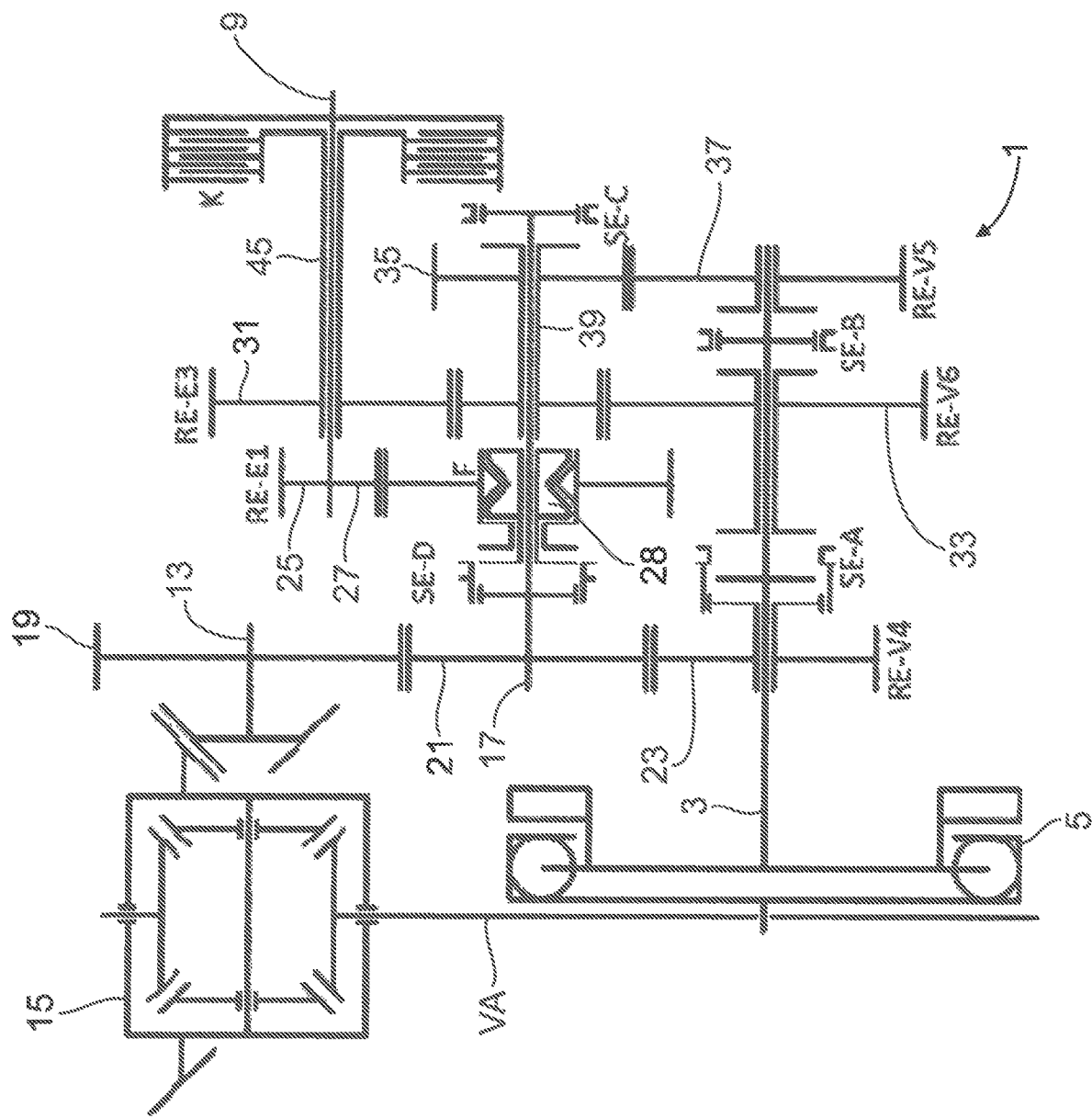
FIG. 3 a second exemplary embodiment of the transmission in FIG. 1.

In FIG. 3, another exemplary embodiment is shown, the structure of which and the mode of function of which are largely identical to the exemplary embodiment shown in FIG. 1. In contrast to FIG. 1, the reverse gear plane RE-VR is omitted. In further contrast to FIG. 1, the two above shifting elements SE-A and SE-E are combined in FIG. 3 to form a common shifting element SE-A. In a first position, the common shifting element SE-A couples the loose gearwheel 23 of the first gear plane RE-V4, which is mounted on the internal combustion engine shaft 3 in a rotatable manner, to the internal combustion engine shaft 3, while, at the same time, the loose gearwheel 23, which is mounted on the internal combustion engine shaft 3 in a rotatable manner, is decoupled from the loose gearwheel 33 of the third gear plane RE-E3. In a second shift position, the common shifting element SE-A no longer couples the loose gearwheel 23 of the first gear plane RE-V4, which is mounted on the internal combustion engine shaft 3 in a rotatable manner, to the internal combustion engine shaft 3, but rather couples it to the loose gearwheel 33 of the third gear plane RE-E3, which is mounted on the internal combustion engine shaft 3 in a rotatable manner.

Figure 4:
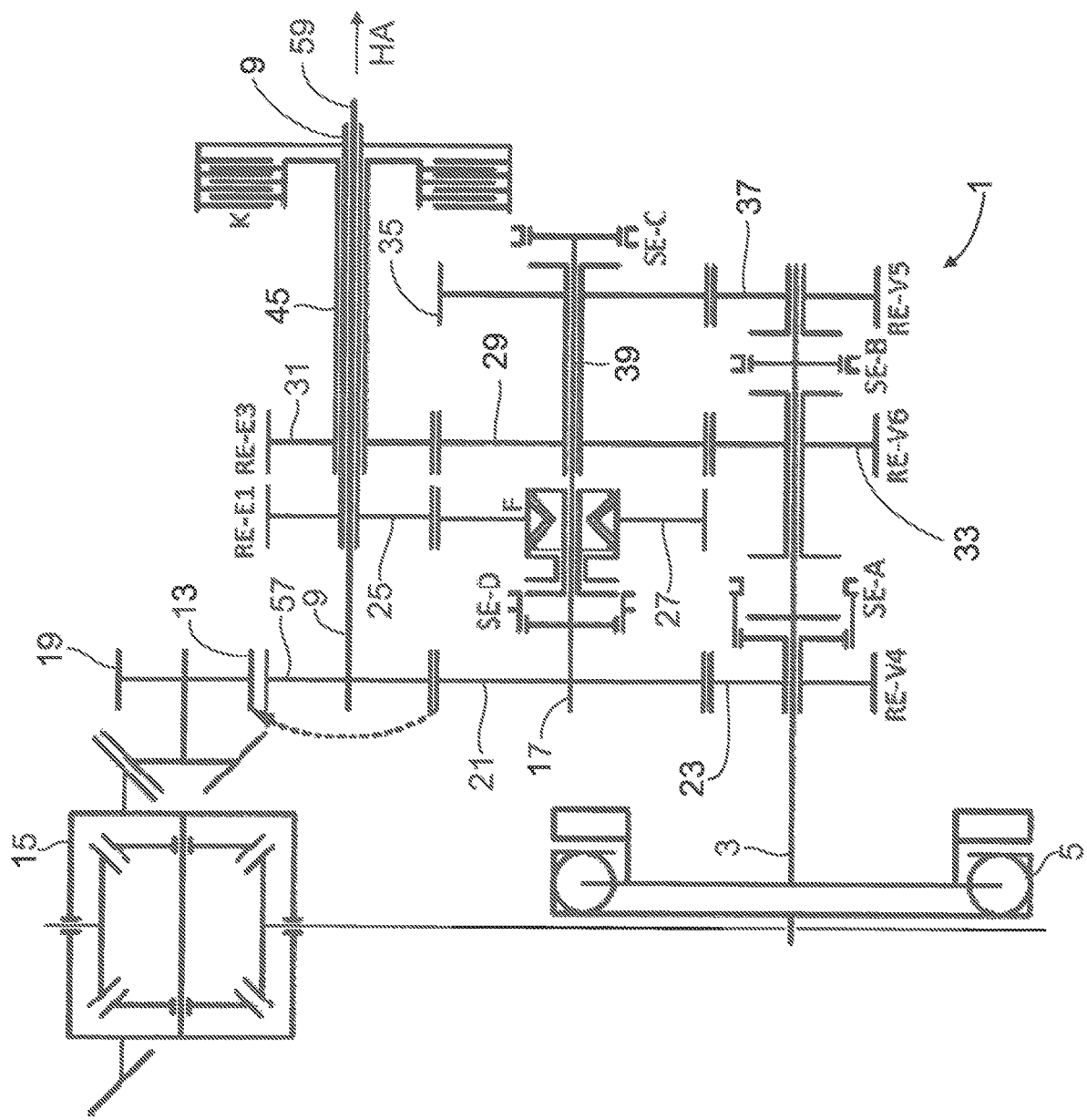
FIG. 4 a further exemplary embodiment of the hybrid transmission.

In FIG. 4, the automatic transmission 1 is designed for an all-wheel drive. In accordance therewith, the gearwheel 21, which is arranged on the intermediate shaft 17 in a rotationally resistant manner, meshes not only with the gearwheel 19, which is arranged on the output shaft 13 in a rotationally resistant manner, but additionally also meshes with a fixed gearwheel 57 of a cardan shaft 59 leading to the second vehicle axle HA. In regard to an arrangement that is favorable in terms of packing space, the electric machine shaft 9 in FIG. 4 is designed as a hollow shaft that is coaxially mounted on the cardan shaft 59 in a rotatable manner.

Figure 5:
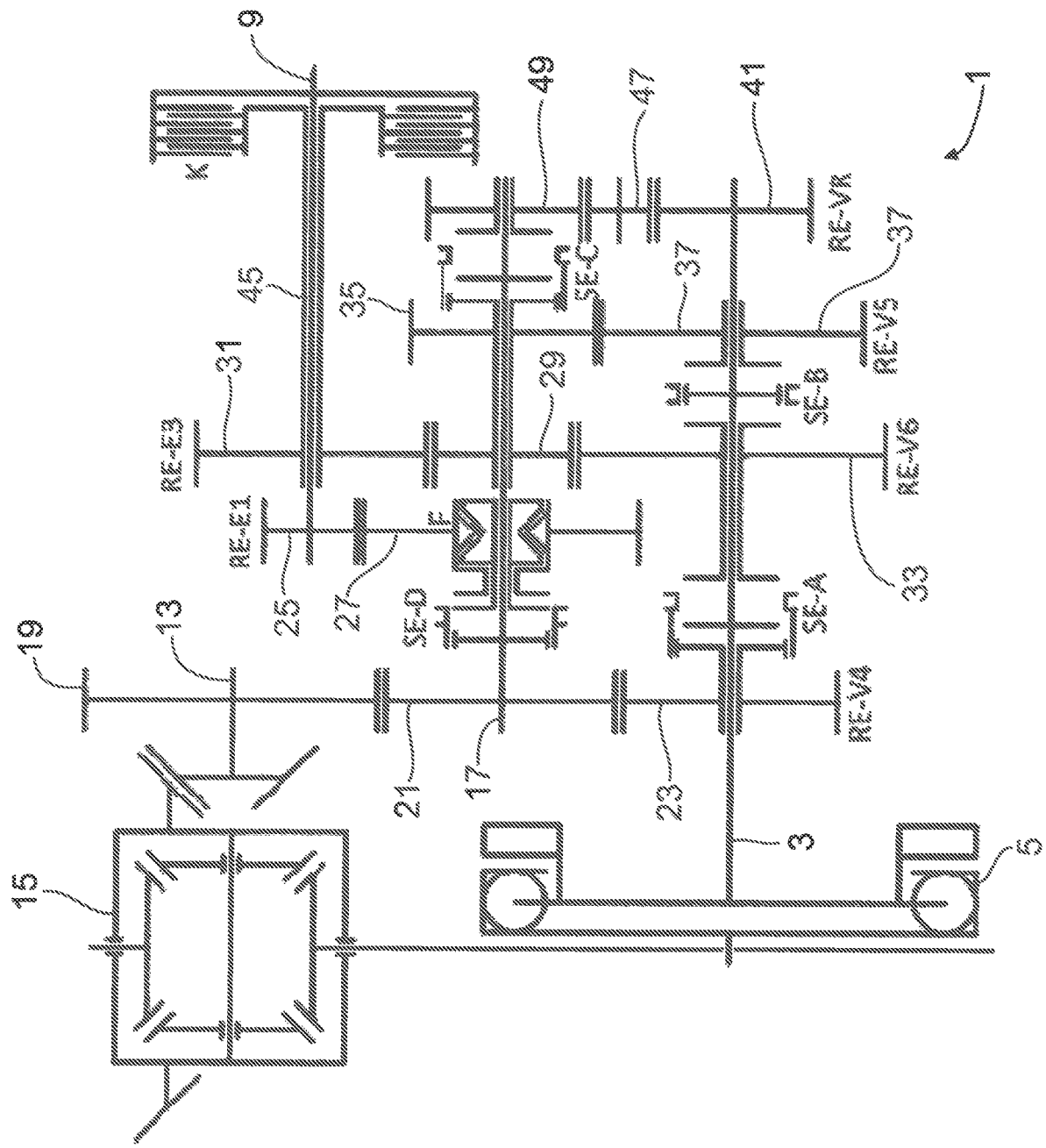
FIG. 5 a further exemplary embodiment of the hybrid transmission.

The gear plane RE-VR of the reverse gear in FIG. 5 is formed alternatively to that in FIG. 5, namely, with a gearwheel 41, which is arranged on the internal combustion engine shaft 3 in a rotationally resistant manner and which, with intervening engagement of an intermediate gearwheel 47, meshes with a gearwheel 49, which is mounted loosely on the intermediate shaft 17 in a rotatable manner. The gearwheel 49 can be coupled via a shifting element SE-C to the hollow shaft 39, which is mounted on the intermediate shaft 17 in a rotatable manner. When the reverse gear is shifted, a flow of force is established, namely, from the internal combustion engine 7 via the internal combustion engine shaft 3, the gearwheels 41, 47, 49 of the reverse gear plane RE-VR, the shifting element SE-C, the hollow shaft 39, the gearwheels 29, 31 of the third gear plane RE-E3, the hollow shaft 45, the multi-plate clutch K, the electric machine shaft 9, the gearwheels 25, 27 of the second gear plane RE-E1, the overrunning clutch F, the shifting element SE-D, the intermediate shaft 17, and the fixed gearwheel 21 of the first gear plane RE-V4 thereof and further to the output shaft 13.

Figure 6:
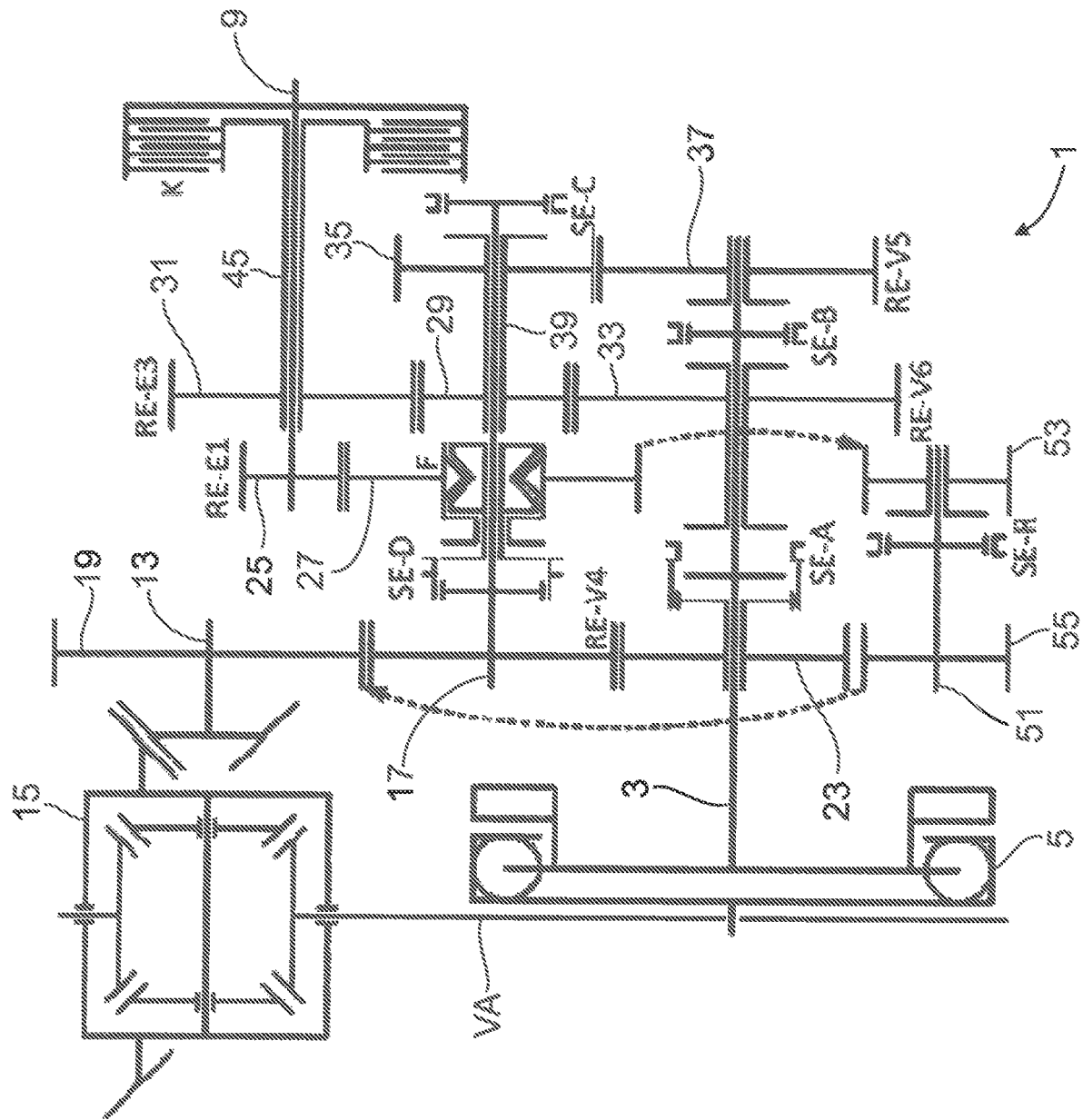
FIG. 6 a further exemplary embodiment of the hybrid transmission.

Alternatively to this, in FIG. 6, The reverse gear in the transmission 1 is realized by way of a reverse gear shaft 51 that is axially parallel to the internal combustion engine shaft 3. Mounted on the reverse gear shaft 51 in a rotatable manner is a loose gearwheel 53, which meshes with the loose gearwheel 27 of the second gear plane RE-E1 mounted on the intermediate shaft 17 and which can be coupled to the reverse gear shaft 51 via a shifting element SE-R. Arranged on the reverse gear shaft 51 is, in addition, a fixed gearwheel 55, which meshes with the fixed gearwheel 19 of the output shaft 13.

In the exemplary embodiments of FIG. 1 as well as FIGS. 3 to 6, the entirety of gear planes are arranged in the axial direction between the internal combustion engine 7 and the electric machine 11. The first gear plane RE-V4 is thereby arranged on the side of the transmission that faces the internal combustion engine 7. In the further axial course, there follows in succession: the second gear plane RE-E1, the third gear plane RE-E3, and the fourth gear plane RE-V5. Therefore, between the first gear plane RE-V4 and the third gear plane RE-E3, there is sufficiently ample packing space for the overrunning clutch F.

Figure 7:
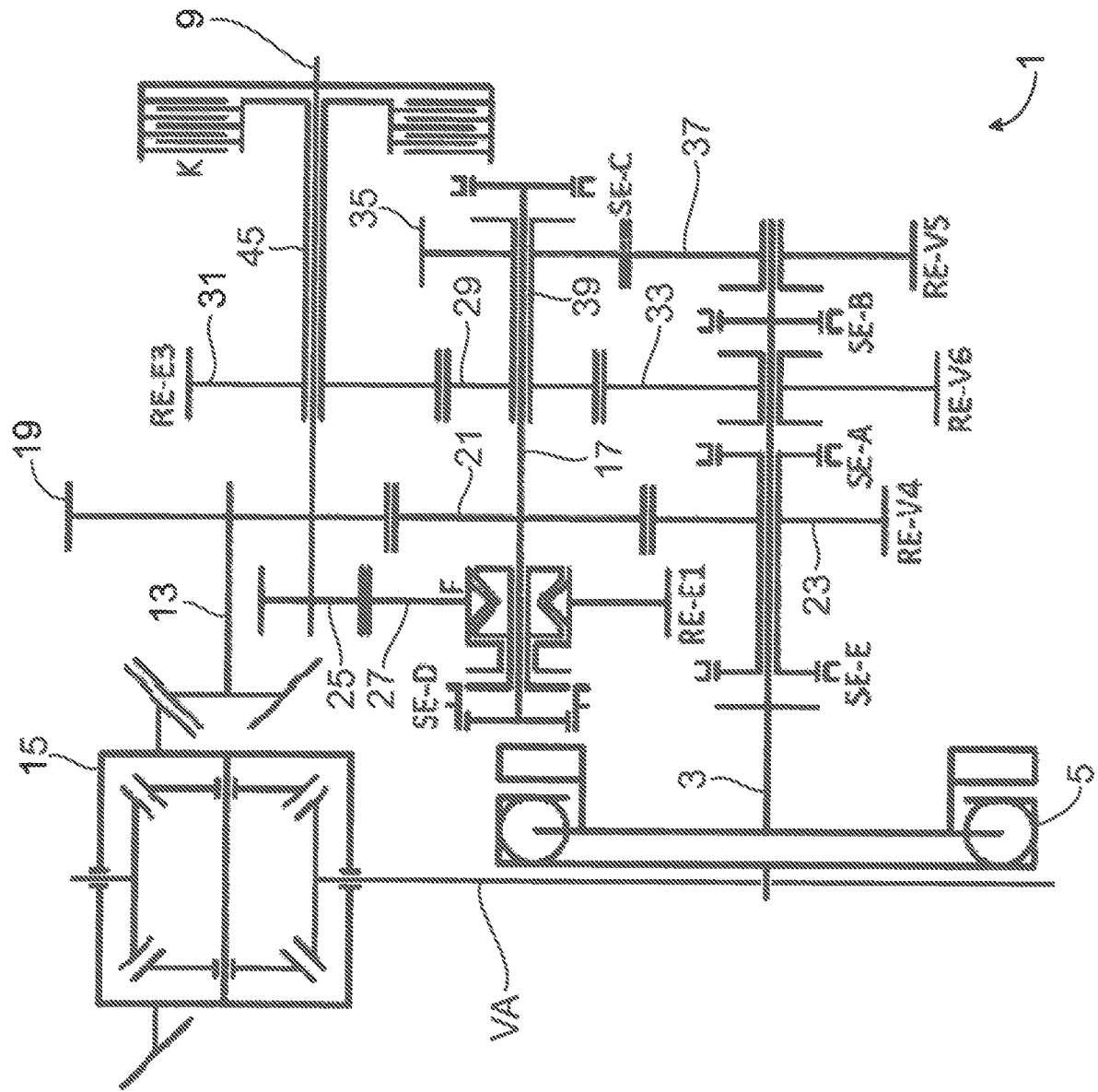
FIG. 7 a further exemplary embodiment of the hybrid transmission.

In contrast to this, in FIG. 7, the axial positions of the first gear plane RE-V4 and the second gear plane RE-E1 are exchanged. In this way, there results a shift layout shown in FIG. 7, in which the overrunning clutch F is positioned in the axial direction at about the same height as the pinion shaft 13. This results in an axially more compact transmission structure in comparison to the preceding exemplary embodiments.

The invention claimed is:

1. A hybrid powertrain for a hybrid-drive motor vehicle, comprising:
a transmission that can be shifted into different gear stages by shifting elements and can be in drive connection with an internal combustion engine via an internal combustion engine shaft, with an electric machine via an electric machine shaft, and with at least one vehicle axle via an output shaft, wherein the internal combustion engine shaft and the electric machine shaft are arranged axially parallel to one another, wherein the transmission is designed as a spur gear unit, in which the internal combustion engine shaft, the electric machine shaft, and the output shaft can be in drive connection with one another via spur gear sets that form gear planes, and can be shifted by the shifting elements, wherein the transmission has an intermediate shaft that is arranged axially parallel between the internal combustion engine shaft and the electric machine shaft, and wherein the intermediate shaft can be connected to the output shaft via a spur gear set that forms a first gear plane, wherein the first gear plane has a gearwheel, which is mounted in a rotationally resistant manner on the intermediate shaft, wherein the first gear plane has a gearwheel, which is mounted in a rotationally resistant manner on the output shaft, which meshes with the gearwheel, which is mounted in a rotationally resistant manner on the intermediate shaft, wherein the first gear plane has a loose gearwheel that is mounted on the internal combustion engine shaft in a rotatable manner, which meshes with the intermediate shaft gearwheel and can be coupled to or decoupled from the internal combustion engine shaft via a first shifting element or a fifth shifting element.

2. The hybrid powertrain according to claim 1, wherein the intermediate shaft can be connected to the electric machine shaft via a spur gear set that forms a second gear plane, and the intermediate shaft can be connected to the electric machine shaft with a spur gear set that forms a third gear plane.

3. The hybrid powertrain according to claim 1, wherein the intermediate shaft can be connected to the internal combustion engine shaft via a spur gear set that forms a fourth gear plane.

4. The hybrid powertrain according to claim 2, wherein the second gear plane has a gearwheel, which is mounted on the electric machine shaft in a rotationally resistant manner, and an intermediate shaft gearwheel, which meshes with it, and which can be connected to the intermediate shaft via an overrunning clutch.

5. The hybrid powertrain according to claim 4, wherein the overrunning clutch is assigned a fourth shifting element, which, in a traction mode position, permits a transmission of torque from the electric machine in the direction of the intermediate shaft and prevents the transmission of torque in the opposite direction, permits the transmission of torque in both directions in a traction/coasting position, and, in an overrun position, prevents the transmission of torque in both directions.

6. The hybrid powertrain according to claim 2, wherein the third gear plane has a loose gearwheel, which is mounted on the intermediate shaft in a rotatable manner and which can be coupled to or decoupled from the intermediate shaft via a third shifting element, and has a loose gearwheel, which meshes with it and is mounted on the electric machine shaft in a rotatable manner, and which can be coupled to or decoupled from the electric machine shaft via a seventh shifting element.

7. The hybrid powertrain according to claim 6, wherein the third gear plane has a loose gearwheel, which is mounted on the internal combustion engine shaft in a rotatable manner, and which can be coupled to or decoupled from the loose gearwheel of the first gear plane, which is mounted on the internal combustion engine shaft via a first shifting element, and can be coupled to or decoupled from the internal combustion engine shaft via a second shifting element.

8. The hybrid powertrain according to claim 6, wherein the fourth gear plane has a loose gearwheel that is mounted on the intermediate shaft, which can be coupled to or decoupled from the intermediate shaft via the third shifting element, and a loose gearwheel, which meshes with it and is mounted on the internal combustion engine shaft in a rotatable manner, and which can be coupled to or decoupled from the internal combustion engine shaft via the second shifting element.

9. The hybrid powertrain according to claim 8, wherein the second shifting element can be shifted at both ends and is arranged between the loose gearwheel of the third gear plane, which is mounted on the internal combustion engine shaft in a rotatable manner, and the loose gearwheel of the fourth gear plane, which is mounted on the internal combustion engine shaft in a rotatable manner, and in that, in a first shift position, the second shifting element couples the loose gearwheel of the third gear plane, which is mounted on the internal combustion engine shaft in a rotatable manner, to the internal combustion engine shaft, and, in a second shift position, couples the loose gearwheel of the fourth gear plane, which is mounted on the internal combustion engine shaft in a rotatable manner, to the internal combustion engine shaft.

10. The hybrid powertrain according to claim 8, wherein the loose gearwheel of the fourth gear plane, which is mounted on the intermediate shaft, and the loose gearwheel of the third gear plane, which is mounted on the intermediate shaft, are arranged in a rotationally resistant manner on a hollow shaft, which is coaxially mounted in a rotatable manner on the intermediate shaft and can be coupled to or decoupled from the intermediate shaft via the exactly one third shifting element.

11. The hybrid powertrain according to claim 7, wherein the first shifting element and the fifth shifting element are combined to form a common shifting element, in the first shift position of which the loose gearwheel of the first gear plane, which is mounted on the internal combustion engine shaft in a rotatable manner, is coupled to the internal combustion engine shaft, and in the second shift position of which the loose gearwheel of the first gear plane, which is mounted on the internal combustion engine shaft in a rotatable manner, is coupled to the loose gearwheel of the third gear plane, which is mounted on the internal combustion engine shaft in a rotatable manner.

12. The hybrid powertrain according to claim 1, wherein the output shaft is a pinion shaft of an axle differential of the vehicle axle, and in the case of an all-wheel drive, the gearwheel, which is arranged on the intermediate shaft in a rotationally resistant manner, meshes not only with the gearwheel, which is arranged on the output shaft in a rotationally resistant manner, but additionally also with a fixed gearwheel of a cardan shaft leading to the second vehicle axle, and the electric machine shaft is designed as a hollow shaft that is mounted coaxially on the cardan shaft in a rotatable manner.

13. The hybrid powertrain according to claim 6, wherein for the embodiment of a reverse gear, the transmission has a spur gear set that forms a gear plane of the reverse gear, and in that the gear plane of the reverse gear has a loose gearwheel that is mounted on the internal combustion engine shaft in a rotatable manner, which can be coupled to or decoupled from the internal combustion engine shaft via a sixth shifting element, and has a loose gearwheel, which meshes with it and is mounted on the electric machine shaft in a rotatable manner, and which, together with the loose gearwheel of the third gear plane, which is mounted on the electric machine shaft in a rotatable manner, is arranged in a rotationally resistant manner on a hollow shaft, which is coaxially mounted on the electric machine shaft in a rotatable manner, and which can be coupled to or decoupled from the electric machine shaft via exactly one seventh shifting element.

14. The hybrid powertrain according to claim 13, wherein the gear plane of the reverse gear has a gearwheel that is mounted in a rotationally resistant manner on the internal combustion engine shaft, which, with intermediate shifting of an intermediate gearwheel, meshes with a loose gearwheel, which is mounted on the intermediate shaft in a rotatable manner, and which can be coupled to or decoupled from the hollow shaft, which is mounted on the intermediate shaft in a rotatable manner, via the third shifting element.

15. The hybrid powertrain according to claim 14, wherein the third shifting element can be shifted at both ends and is arranged between the loose gearwheel of the fourth gear plane, which is arranged on the hollow shaft in a rotationally resistant manner, and the loose gearwheel of the gear plane of the reverse gear, which is mounted on the intermediate shaft in a rotatable manner, and in that, in a first shift position, the third shifting element couples the hollow shaft, which is mounted on the intermediate shaft in a rotatable manner, to the loose gearwheel, which is mounted on the intermediate shaft in a rotatable manner, and, in a second shift position, couples the hollow shaft, which is mounted on the intermediate shaft in a rotatable manner, to the intermediate shaft.

16. The hybrid powertrain according to claim 4, wherein for the embodiment of a reverse gear, the transmission has a reverse gear shaft, which is axially parallel to the internal combustion engine shaft and on which a loose gearwheel is mounted in a rotatable manner and which meshes with the loose gearwheel of the second gear plane, which is mounted on the intermediate shaft, and, via a sixth shifting element, can be coupled to or decoupled from the reverse gear shaft, and in that, on the reverse gear shaft, a fixed gearwheel is arranged, which meshes with the fixed gearwheel of the output shaft.

17. The hybrid powertrain according to claim 2, wherein all, exactly four gear planes of forward gears, are arranged in the axial direction between the internal combustion engine and the electric machine.

18. The hybrid powertrain according to claim 17, wherein the first gear plane is arranged on the side of the transmission that faces the internal combustion engine, and in that, in the further axial course, there follows in succession: the second gear plane, the third gear plane, and the fourth gear plane.

* * * * *